United States Patent

Sperti

[11] Patent Number: 5,515,609
[45] Date of Patent: May 14, 1996

[54] TUBING CUTTER OF SELECTABLE FORCE

[76] Inventor: Vincent R. Sperti, 2502 Arslan St., Deltona, Fla. 32738

[21] Appl. No.: 344,145

[22] Filed: Nov. 23, 1994

[51] Int. Cl.$^6$ ............................................. B23D 21/06
[52] U.S. Cl. .................... 30/101; 30/75; 82/99.1
[58] Field of Search ...................... 30/90.1, 90.8, 30/91.2, 90.9, 90.3, 101, 102, 94, 95; 81/9.4, 9.41; 83/522.19, 54; 82/99.1, 101

[56] References Cited

U.S. PATENT DOCUMENTS

| | | | |
|---|---|---|---|
| 1,129,310 | 2/1915 | Platt | 81/9.4 |
| 1,945,949 | 2/1934 | Myers . | |
| 2,089,528 | 8/1937 | Barycz | 81/9.4 |
| 2,350,700 | 6/1944 | Segerberg | 30/102 |
| 2,649,654 | 8/1953 | Carta | 30/90.9 |
| 2,747,275 | 5/1956 | Jonasson | 30/102 |
| 3,082,523 | 3/1963 | Modes et al. | 30/90.1 |
| 3,315,355 | 4/1967 | Osburn et al. | 30/102 |
| 3,403,442 | 10/1968 | Reese et al. | 30/102 |
| 3,522,617 | 8/1970 | Kowal . | |
| 3,636,798 | 1/1972 | Van Dalen et al. | 30/90.1 |
| 4,270,269 | 6/1981 | Weil et al. | 30/102 |
| 4,864,726 | 9/1989 | Wu et al. | 30/90.1 |
| 5,099,577 | 3/1992 | Hutt . | |
| 5,206,996 | 5/1993 | McDaniel . | |
| 5,230,150 | 7/1993 | Sperti . | |

FOREIGN PATENT DOCUMENTS

| | | | |
|---|---|---|---|
| 2416934 | 8/1973 | Germany | 81/9.4 |
| 670829 | 4/1952 | United Kingdom | 30/90.9 |

*Primary Examiner*—Kenneth E. Peterson
*Attorney, Agent, or Firm*—Julian C. Renfro

[57] ABSTRACT

A hand operated tubing cutter adapted to apply a selectable force to tubing to be cut, with the cutter having an elongate, substantially "C" shaped body member and defining a recess for receiving a piece of tubing to be cut. A spaced pair of rollers is operatively mounted in the central recess, directly against which rollers a piece of tubing to be cut is to be placed. An elongate cavity is disposed in the body member in substantial alignment with the pair of rollers, and an elongate ram member is slidably disposed in a non-rotatable manner in the elongate cavity, one end of which ram member supports a cutter wheel. The cutter wheel is rotatably supported in an opposed relationship to the rollers, and a rotatable adjustment device is located on the body member at a location comparatively remote form the rollers. A compression spring is disposed in the body member and operably interconnected with the ram member. The rotatable adjustment device is selectively rotatable to control the positioning of the ram member and therefore the positioning of the cutter wheel with respect to the rollers. The selective rotation of the rotatable adjustment device also modifies the force applied to the ram member by the spring, and therefore the force applied to the cutter wheel, thereby selectively controlling the amount of force consistently applied by the cutter wheel during the cutting of tubing residing on the rollers.

12 Claims, 2 Drawing Sheets

5,515,609

TUBING CUTTER OF SELECTABLE FORCE

FIELD OF THE INVENTION

This invention relates generally to a hand operated tubing cutter employing spring loading to produce a biasing force on the cutter blade, as well as relating to an override of the spring biasing force when cutting particularly hard tubing.

BACKGROUND OF THE INVENTION

Hand operated tools for cutting tubing, light pipe, and other hollow cylindrical materials are well known, with such devices generally including a cutter blade or wheel disposed opposite a pair of rollers, thus providing triangulation and positive location around the circumference of the material being cut. The cutting device is rotated about the circumference of the material being cut, in order to move the cutting blade completely around the material.

One feature universal of all such cutting devices is a means to advance the cutting blade into the material being cut as the operation is performed, due to the ever increasing depth of the cut as the operation progresses. Quite obviously, if the cutting blade is not advanced, an initial shallow cut would be made about the circumference of the material and no further cutting action would take place. The general method for advancing the cutting blade in prior art implements is by means of a threaded screw advance of the rotary cutting blade. Although the positive advancement thereby provided is effective, it generally requires manual advancement of the cutting blade by means of the screw adjustment every one or two turns of the cutter around the material, which obviously is a tedious procedure if the material being cut has a relatively thick wall. Moreover, great care must be used in advancing the cutting blade inasmuch as the blade edge may be dulled or damaged, or more importantly, the sidewall of the tubing may be so badly deformed as to drastically impair the cutting procedure if the screw advance is tightened too much. On the other hand, too little force on the cutting blade advance means results in a relatively slow and inefficient cutting operation.

Additional features are desirable in such cutters to further enhance the cutting operation, such as a fine adjustment of a spring force utilized for biasing the cutting blade toward the rollers, in order to optimize the cutting rate and pressures.

The need arises for a cutting tool for tubing or the like that is capable of automatically providing constant pressure to the material being cut by the cutting blade or wheel. Such a tool makes it possible to obviate any requirement for manual adjustment of the tool during the cutting operation, with the constant pressure applied to the material being selectable by the user by reference to scales conveniently provided on the tool. Also needed is an override arrangement such that the pressure applied by the cutter wheel to the tubing can be directly controlled during the cutting of tubing that is particularly hard or difficult to cut.

It was in an effort to achieve these and other significant objectives that the present invention was made.

SUMMARY OF THE INVENTION

A hand operated tubing cutter adapted to apply a selectable force to tubing to be cut is provided in accordance with this invention, with this cutter having an elongate, substantially "C" shaped body member. The body member defines a central recess in which a piece of tubing to be cut can be placed, with a spaced pair of rollers being operatively mounted in the central recess of the body member, against which a piece of tubing to be cut is to be placed. An elongate cavity is disposed in the body member in substantial alignment with the pair of rollers, and an elongate ram member is slidably disposed in a non-rotatable manner in the elongate cavity. One end of the ram member supports a rotatable cutter wheel, with the cutter wheel being supported in an opposed relationship to the rollers. Rotatable adjustment means are located on the body member at a location comparatively remote from the pair of rollers, and a compression spring is operably disposed in the body member, being confined by the upper body member and the rotatable adjustment means that is threadedly connected to the ram member. The rotatable adjustment means is selectively rotatable to control the positioning of the ram member and therefore the placement of the cutter wheel with respect to the rollers. The selective rotation of the rotatable adjustment means also serves to modify the force applied on occasion to the ram member by the spring, and therefore the force applied to the cutter wheel. In this way a selective control over the amount of force applied by the cutter wheel to a piece of tubing residing against the rollers can be brought about.

Quite importantly, motion limiting means are utilized for limiting the amount of spring compression able to be brought about by rotation of the rotatable adjustment means. When such compression limit has been reached, further force applied by the rotatable adjustment means to the ram member during contact of the cutter wheel with the tubing brings about the direct application of force on the ram, and therefore to the cutter wheel.

In the preferred instance, the rotatable adjustment means threadedly engages the ram member, with rotation of the rotatable adjustment means in a tightening direction serving to move the cutter wheel closer to the rollers, and rotation in the opposite direction causing the cutter wheel to move away from the rollers.

OBJECTS OF THE INVENTION

A primary object of my invention is to provide a hand operated tubing cutter having means enabling the preadjustment of the cutting pressure to exact increments, thereby permitting the selection of a maximum safe force for the cutting of tubing of a particular material, and preventing an undesired deformation of the tubing during the cutting procedure.

Another object of my invention is to provide a hand operated tubing cutter having means permitting the selection of the optimum spring pressure to be used in cutting a particular piece of tubing, but also permitting this feature to be overridden when particularly hard tubing is to be cut.

Still another object of my invention is to provide a hand operated tubing cutter in which the space or opening between the cutter wheel and the pair of support rollers used in conjunction with the cutter wheel can be preadjusted, thus minimizing the need to rotate the rotatable adjustment device for the cutter wheel to a substantial extent during one handed operation of the tubing cutter.

It is yet still another object of my invention to provide a hand operated tubing cutter having two numerical scales assisting the user in adjusting spring pressure, with a scale on the upper body of the tubing cutter displaying the units of pressure, and a scale around the skirt of the rotatable adjustment knob provided on the upper body displaying units of pressure or partial units of pressure.

It is still another object of this invention to provide a ram member for supporting the cutter wheel of a tubing cutter that has tube-contacting means on each side of the cutter wheel, to prevent the cut ends of the tubing from falling away.

It is still another object of my invention to provide an extensible, rotatably mounted deburring cutter normally contained in the body portion of the tubing cutter, but selectively extensible so that the user can deburr the interior of a freshly cut piece of tubing by moving the tubing cutter in a circle without having to actually rotate the tubing center.

These and other objects, features and advantages will become more apparent from a study of the appended drawings.

DETAILED DESCRIPTION

Figure 2:
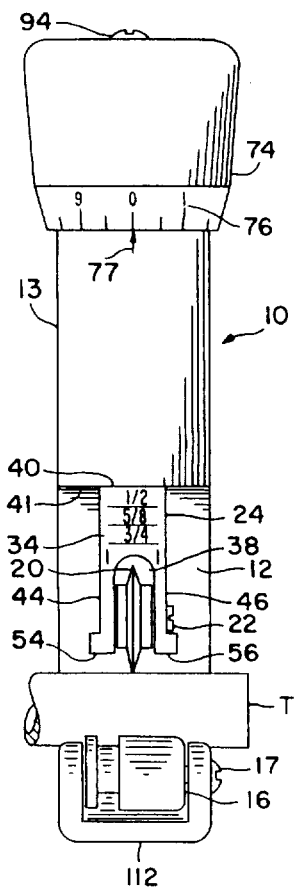
FIG. 2 is a front view of my novel tubing cutter, showing the mounting of the cutter wheel on a vertically movable ram member, and also showing the sharpened edge of the cutter wheel having been brought into firm contact with tubing to be cut.
Figure 1:
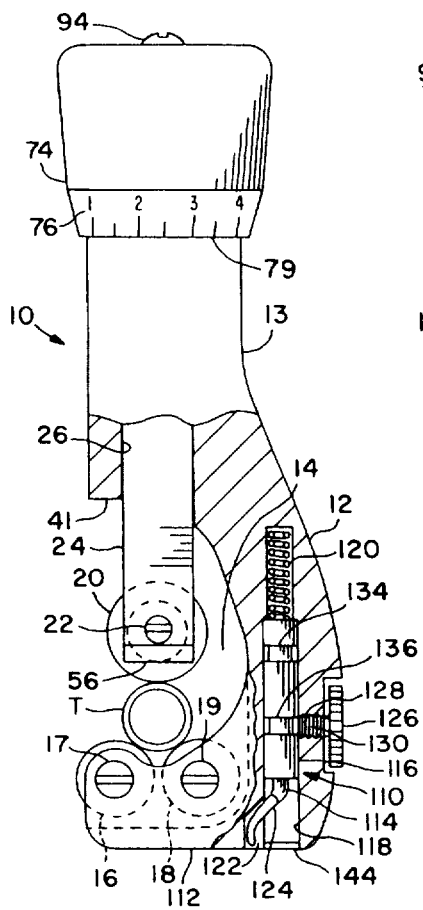
FIG. 1 is a side elevational view of a tubing cutter in accordance with this invention, with part of the body portion of the cutter removed in order to reveal certain features of internal construction, including the novel deburring tool in its retracted position.
Figure 3:
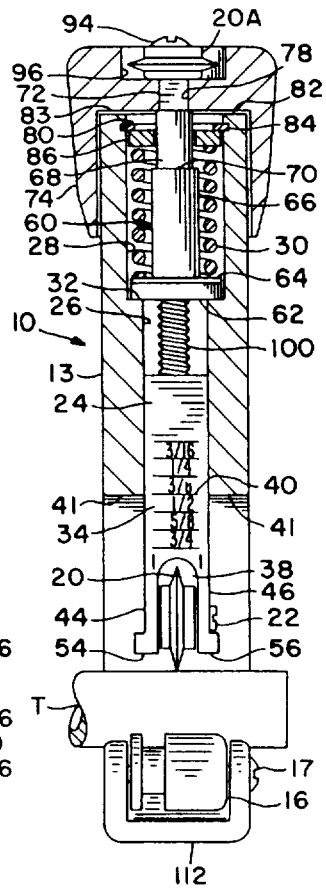
FIG. 3 is a view generally similar to FIG. 2 but with substantial portions of the body member removed to reveal a compression spring making it possible for a consistent, selectable amount of force to be applied to the cutter wheel, thereby avoiding undesirable deformation of the tubing being cut.

With initial reference to FIGS. 1 through 3 it is to be seen that I have provided a hand operated tubing cutter 10 having an elongate, substantially "C" shaped body portion 12. As will be noted from FIG. 1, the body portion 12 is configured so as to define a central recess 14 in which a piece of tubing T to be cut can be placed. I may hereinafter refer to the body portion 12 as the lower body portion or the principal body portion, to differentiate it from the upper body portion 13, visible in FIGS. 1 through 3, with a substantial portion of the upper body portion being illustrated in fragmentary detail in FIG. 4.

In a manner generally resembling the hand operated tubing cutters taught in accordance with the prior art, I provide a spaced pair of rollers 16 and 18 operatively mounted in a parallel relationship on a lower part of the principal body portion 12. The rollers may be regarded as being mounted in or adjacent the central recess 14 by the use of bolts 17 and 19, respectively. As to be seen in FIGS. 1 through 3, a piece of tubing T to be cut is placed directly against the adjacent pair of rollers 16 and 18, thus to be positioned for cutting by the action of the cutter wheel 20. The cutter wheel 20 can be selectively positioned with respect to the rollers 16 and 18 by an novel arrangement described in detail hereinafter, which involves rotatable adjustment means or upper knob 74 located upon the upper body portion 13, with a numerical scale 76 provided around the skirt portion or lower periphery of the knob 74 for a purpose described at length hereinafter. A numerical scale 75 is also provided on the upper body portion, just below the knob 74, which will also be described hereinafter.

FIGS. 1 through 3 reveal an elongate ram member 24, upon the lower end of which the cutter wheel 20 is rotatably mounted, such as by a retaining screw 22. The elongate ram member 24 is slidably mounted in a non-rotatable manner in an elongate cavity 26 primarily disposed in the upper body portion 13 of the tubing cutter 10, with it to be noted from FIG. 1 that the elongate cavity 26 is in substantial alignment with the pair of rollers 16 and 18. Because of this alignment of the elongate cavity 26 with the pair of rollers, the cutter wheel 20 can be selectively brought into the tube-cutting relationship with the rollers 16 and 18 in the manner clearly illustrated in FIG. 1 at such time as the ram member 24 has been caused by selective rotation of the rotatable adjustment means or upper knob 74 to move toward the rollers. Although the cutter wheel 20 works cooperatively with the rollers 16 and 18, I may on occasion refer to the relationship of the cutter wheel to the pair of rollers as being an opposed relationship.

With particular reference to FIGS. 2 and 3, it will be noted that I have provided a numerical scale 34 on the front surface of the vertically movable ram member 24, with a parallel series of horizontally disposed lines 40 separating the numbers of the numerical scale 34. It is to be understood that the lines 40 serve as reference points assigned to the several numbers appearing on the scale 34. To be of assistance to the user in accurately reading the scale on the vertically movable ram member, I provide a projecting surface 41 on the upper body member 13, which surface is visible in FIGS. 2 and 3, but seen in greater detail in FIG. 1. The projecting surface 41 serves as a ready and accurate means or reference mark for reading and interpreting the numbers on the scale 34. This is a particularly advantageous arrangement, for it enables an operator or user of the tubing cutter to preadjust the size opening needed for the insertion of a specific size tubing between the cutter wheel 20 and the pair of rollers 16 and 18. In the instance illustrated in FIGS. 2 and 3, the user has positioned the ram member 24 such that the line 40 corresponding to the ½ inch mark of the numerical scale 34 is in alignment with the reference mark or reference surface 41. In the illustrated instance, this means that the tubing cutter is prepared to cut tubing T that is ½ inch in diameter.

It is further to be noted in FIG. 3 that the elongate cavity 26 is provided in a part of the upper body portion 13 that is comparatively remote from the rollers 16 and 18. Inasmuch as it is not desired for the ram member 24 to rotate in the elongate cavity 26, the cavity 26 may have a generally rectangularly-shaped cross section, and the ram member is configured in a like manner, so as to be able to fit closely yet slidably in the elongate cavity 26; note FIG. 11.

Figure 4:
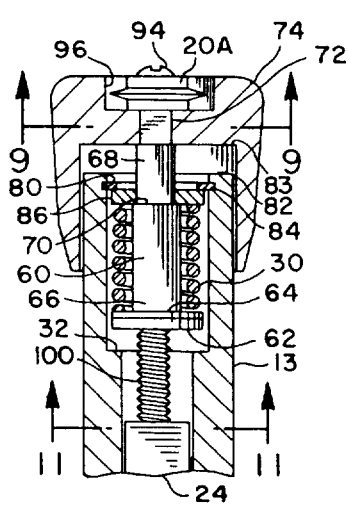
FIG. 4 is a fragmentary view of the upper end of the tubing cutter as illustrated in FIG. 3, with this view revealing how the function of the compression spring can be overridden when a certain degree of spring compression has been reached.

FIGS. 3 and 4 reveal that elongate cavity 26 enlarges upwardly into a spring cavity 28, with latter cavity serving as the repository for compression spring 30 provided for the purpose of providing a consistent downward force upon the slidable ram 24. As will be seen in greater detail hereinafter, by the user bringing about a distinct downward force of the spring 30 by suitable rotation of the rotatable adjustment means 74 in the tightening direction, a consistent and sufficient downward force of the spring against the ram member 24 via the threaded member 100 causes the sharpened edge of the cutter wheel 20 to sever the tubing during relative rotation of the tubing cutter with respect to the tubing.

It is to be understood that the elongate cavity 26 and the spring cavity 28 are disposed on a common centerline, with the upper end of the spring cavity 28 being substantially open so as to permit a proper installation of the compression spring 30 as well as the components closely associated therewith. I prefer for the spring cavity 28 to be circular in cross section, with the exterior portion of the upper body member 13 adjacent the cavity 28 likewise being of circular cross section. Because the diameter of the spring cavity 28 is somewhat larger than the cross section of the elongate cavity 26, a shoulder member 32 is defined on the internal sidewall of the upper body portion 13 between the two chambers, which shoulder member serves, in a manner described hereinafter, to support certain components associated with the compression spring 30.

Figure 6:
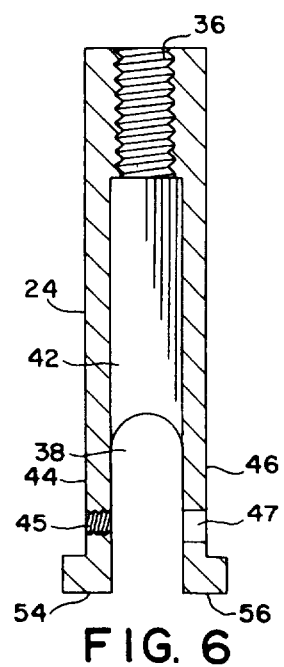
FIG. 6 is a fragmentary view, to a somewhat larger scale, of the power ram of FIG. 3.
Figure 11:
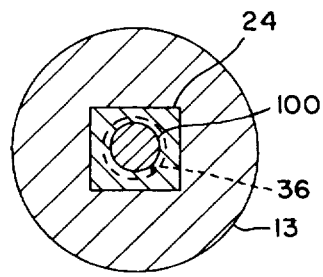
FIG. 11 is an enlarged cross sectional view illustrating the slidable, non-rotatable relationship of the power ram to the bore in the body of the tubing cutter.

In FIGS. 6 and 11 I reveal the elongate ram member 24 to have a threaded hole 36 in its upper end, which hole extends along the centerline of the ram member, with the lower end of the ram member having a slot 38 in which the cutter wheel 20 is to be mounted; note FIG. 3. For a purpose shortly to be apparent, a cavity 42 exists between the underside of the threaded hole 36 and the slot 38 of the ram member 24.

Figure 7:
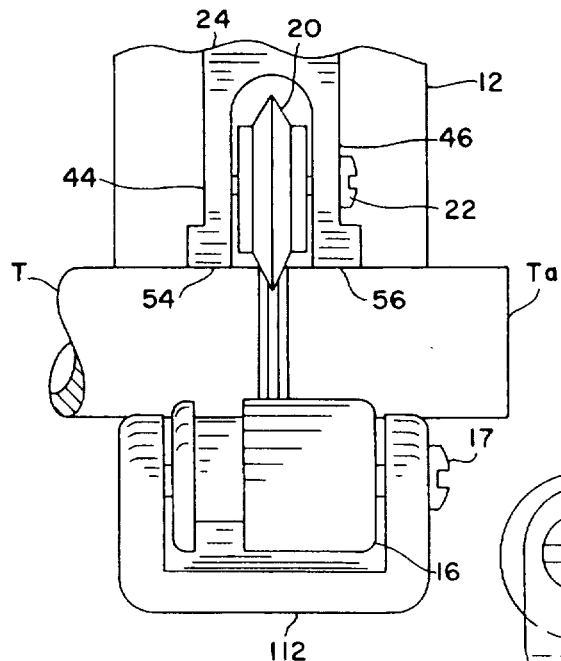
FIG. 7 is a fragmentary view to a substantially large scale, revealing the action of the cutter wheel against tubing to be cut and illustrating the use of pressure pads on the ram member, which serve to prevent the cut tubing portions from falling away.

The placement of the slot 38 in the lower end of the ram member 24 brings about the creation of spaced-apart cutter wheel supporting members 44 and 46, with member 44 having a threaded hole 45, and member 46 having a somewhat larger non-threaded hole 47 disposed in alignment with the threaded hole 45. As will be obvious to those skilled in this art, the previously-mentioned retaining screw 22 is to be initially inserted into non-threaded hole 47, the cutter wheel 20 placed upon the screw, and then the threads of the screw 22 caused to engage the threaded hole 45. When the screw 22 is tightened, it serves to hold the cutter wheel securely yet rotatably in the lower end of the ram member 24. Provided on the underside of the supporting member 44 is a pad 54, and provided on the underside of supporting member 46 is a pad 56, with these pads being designed to contact, after a cutting action has taken place, the cut pieces of the tubing, thus to prevent such cut pieces of tubing from falling away from the tubing cutter. In FIG. 7 I show the pads 54 and 56 in contact with freshly cut tubing pieces T and Ta.

Returning to a consideration of FIG. 3, principally disposed in the spring cavity 28 is an adjustment shaft assembly 60, which may also be called an interconnection means and which is constituted by several sections or components disposed along a common centerline. The previously-mentioned shoulder member 32 on the inner sidewall of the upper body portion 13 serves during certain phases of the operation of my tubing cutter as the support for the adjustment shaft assembly 60, and to this end I provide an annular collar 62 to directly contact the shoulder member 32. I prefer to utilize a thrust washer 64 atop the collar 62, which thrust washer is contacted by the lower end of the compression spring 30.

Also to be noted in FIG. 3 is the provision of a circumferential slot 80 created in the upper body member 13, at a location in the spring cavity 28 near the uppermost edge 82 of the body member 13. Disposed in the circumferential slot 80 is a lock ring 84 serving to restrain upward movement of the compression spring 30. Typically I interpose a thrust washer 86 between the lock ring 84 and the upper coils of the compression spring 30, with it being the purpose of this arrangement to prevent the uppermost coil of the compression spring 30 moving beyond the location depicted in FIG. 3.

One part of the adjustment shaft assembly or interconnection means 60 is the cylindrically-shaped lower shaft portion 66, which is surrounded by the coils of the compression spring 30, thus to serve as a centering means for this spring. Located directly above the lower shaft portion 66 and integral therewith is the middle shaft portion 68, with the diameter of the middle shaft portion 68 being smaller than the diameter of the lower shaft portion 66. This causes an annularly-shaped collar 70 to be defined at the juncture of these two shaft portions.

The annular collar 70 is of a larger diameter than the inner diameter of the thrust washer 86 located above the spring 30, with this of course meaning that when the annular collar 70 comes into contact with the thrust washer 86, no further compression of the compression spring 30 can take place as a consequence of the rotation of the rotatable adjustment means 74, this being true in view of the fact that lock ring 84 prevents the uppermost end of the spring 30 moving upward out of the spring cavity 28. I may refer to this as a spring override arrangement, which is of consequence when tubing of fairly hard metal is being cut, and the potential energy being stored in the compression spring cannot be relied upon as a force sufficient to cause the cutter wheel 20 to cut ever deeper into the tubing T during rotation of the tubing cutter.

Figure 9:
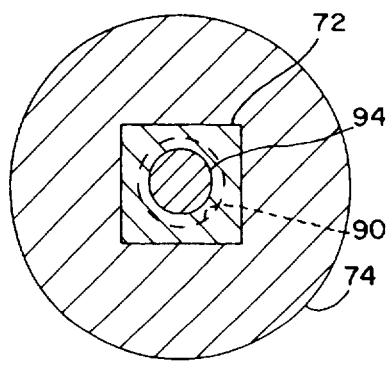
FIG. 9 is an enlarged cross sectional view showing the relationship of the uppermost section of the adjustment shaft assembly to the central opening of the adjustment wheel utilized for advancing or retracting the cutter wheel.

With continued reference to FIG. 3, it is to be noted that located directly above the middle shaft portion 68 is the upper shaft portion 72, which is deliberately of non-circular cross section. The shaft portion 72 is made non-circular so that the previously mentioned rotatable adjustment means 74 can be secured on the shaft portion 72 in such a manner as to be rotatable therewith at all times. For example, the upper shaft portion 72 can be square in cross section, as revealed in FIG. 9, in which case the central aperture 78 of the rotatable adjustment means 74 is likewise square in cross section. I am not to be limited to this, however, for the upper shaft portion 72 could be splined, in which case the central aperture 78 of the rotatable adjustment means 74 would be configured to closely receive such splined shaft portion.

The upper shaft portion 72 preferably has a threaded hole 90 in its uppermost portion, so that a screw 94 of suitable length can be utilized for holding the rotatable adjustment means 74 in a fully operable relationship to the upper shaft portion 72, and therefore to the entire adjustment shaft assembly or interconnection means 60. The lower shaft portion 66, the middle shaft portion 68 and the upper shaft portion 72 are all disposed on a common centerline, and are preferably of one-piece construction.

As visible in FIGS. 3 and 4, a cavity 96 can be provided on the upper surface of the rotatable adjustment means 74, which cavity is large enough to receive a spare cutter wheel 20a that could be quickly substituted should the initially-provided cutter wheel 20 become dull in use. Obviously the screw 94 is long enough to pass through the spare cutter wheel and still have enough available threads as to engage the threaded hole 90 provided in the upper shaft portion 72.

The adjustment shaft assembly 60 further includes an elongate lower member 100, that extends downwardly from the lower shaft portion 66 and that contains threads intended to engage the threaded hole 36 located in an upper portion of the slidable ram 24. The threaded member 100 is disposed upon the common centerline with the other components of the adjustment shaft assembly 60, and in most instances I prefer for the threaded member 100 to be created out of the same piece of metal as was used in the construction of the other portions or sections of the adjustment shaft assembly 60. As a consequence of this arrangement, when the adjustment shaft assembly 60 is caused to rotate as a result of rotation of the rotatable adjustment means 74 by the user, the rotation of the threaded member 100 causes the ram member 24 to move in one direction or the other along the elongate cavity 26 provided in the upper body portion 13.

For example, when the rotatable adjustment means 74 is rotated in the tightening direction, the threaded member 100 likewise rotates, and by virtue of its threaded relationship with the ram member 24, it causes the ram member to move downwardly in the elongate cavity 26, and thus to bring about the sharpened edge of the cutter wheel 20 moving into firm contact with the tubing T. Rotating the member 74 in the opposite direction causes the sharpened edge of the cutter wheel to move away from the tubing T, with the threaded member 100 in some instances moving into the cavity 42 during upward movement of the ram member 24, the cavity 42 being located in the central portion of the ram member 24.

This invention differs significantly from prior art tubing cutters by the instant arrangement involving the compression spring 30 and the adjustment shaft assembly 60. It is to be noted that continued rotation of the rotatable adjustment means 74 in the tightening direction does not in every instance cause the sharpened edge of the cutter wheel 20 to move ever more tightly into contact with the tubing T. Rather, continued rotation of the rotatable adjustment means 74 in the tightening direction instead causes, in accordance with this invention, the annular collar 62 and the thrust washer 64 to move away from contact with the previously-mentioned shoulder member 32 in the manner shown in FIG. 4 after the sharpened edge of the cutter wheel has come into firm contact with the tubing T.

Because of the utilization of the previously mentioned lock ring 84 in the circumferential slot 80 located in the upper end of the spring cavity 28, the upper portion of the compression spring 30 cannot move upwardly from the position depicted in FIGS. 3 and 4. As a result of the novel arrangement I use, the coils of the spring 30 are caused to be compressed by further rotation of the rotatable adjustment means 74 in the tightening direction, thus bringing about the storage of a considerable amount of potential energy in the spring 30.

As is obvious, the amount of potential energy stored in the spring 30 is under the control of the user of the tubing cutter, so that by selective rotation of the rotatable knob 74, the user can carefully set the desired amount of spring force applied to the cutter wheel 20, such that the sidewall of a soft piece of tubing will not be crushed or substantially deformed.

Figure 5:
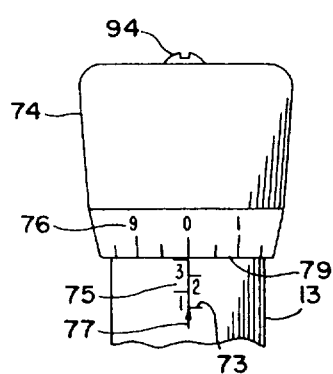
FIG. 5 is a fragmentary view of the rotatable adjustment means or adjustment knob utilized on the upper body of my novel tubing cutter, revealing the utilization of a numerical scale around the lower periphery or skirt portion of the adjustment knob for displaying increments of pressure or partial units of pressure, with the scale on the upper body displaying the units of pressure.

With reference to FIG. 1, it will be noted that the rotatable adjustment means or knob 74 has a lower peripheral portion upon which a quantitative measurement scale 76 is utilized, with an index mark 77 being provided to assist the reading of the scale 76. In FIG. 5 I reveal a preferred arrangement in which a quantitative measurement scale 75, involving a numbered series of reference lines 73, is utilized on the upper body portion 13 at a location adjacent the skirt portion or lower peripheral portion of the rotatable adjustment device 74. The reference lines 73 of the scale 75 on the body member identify units of pressure, whereas the quantitative measurement scale 76 on the lower peripheral portion of the rotatable adjustment means 74 is to be used in identifying subunits of pressure. As will be obvious to those skilled in this art, the scales 75 and 76, utilized together, enable a user, by appropriate rotation of the rotatable adjustment device 74, to precisely preadjust the spring 30 to a desired cutting pressure. This arrangement of course enables the user of my novel tubing cutter to readily establish the degree of force being applied in a given instance to the tubing by the cutter wheel 20.

Quite advantageously, when the compression spring 30 has been compressed to a selected extent by rotation of the rotatable adjustment means or upper knob 74, it provides a consistent amount of force to the ram member 24, causing the cutter wheel 20 carried by the ram member to continue to cut the tubing as relative rotation takes place between the tubing cutter 10 and the tubing. This aspect of my invention is particularly consequential inasmuch as any crushing or substantial deformation of the tubing is carefully avoided, presuming of course that the user has rotated the rotatable adjustment means 74 so as to carefully establish a suitable degree of compression of the spring 30. This is to be contrasted with the situation that can take place when a conventional tubing cutter is being utilized, for in that instance it is entirely possible for a user that is preoccupied or that is working very rapidly to twist the upper knob of such tubing cutter sufficiently tightly as to bring about deformation or crushing of the tubing being cut.

It is obvious that the relationship of the compression spring 30 with the adjustment shaft assembly or interconnection means 60 is such as to make possible a smooth, consistent cutting action rather than a possibly erratic action of the cutting wheel 20 against the tubing.

It is important to note that my invention is not to be limited to an arrangement in which the user must entirely rely upon the preloading of the compression spring 30 for bringing about an appropriate action of the cutting wheel 20 against the tubing to be cut. It will be recalled that I earlier mentioned the creation of the annular collar 70 around the upper end of the lower shaft portion 66, and further mentioned that the collar diameter is sufficiently large as to come into firm contact with the underside of thrust washer 86 after the spring 30 has been compressed to a certain extent as a consequence of the rotation of the rotatable adjustment means or upper knob 74 in the tightening direction. Because as earlier mentioned, the uppermost end of the spring 30 is restrained by the aforementioned lock ring 84 against upward motion, when the annular collar 70 has moved into contact with the thrust washer 86, any further tightening of the rotatable adjustment means 74 causes the ram member 24 to commence downward movement. This in turn causes the cutting edge of the cutter wheel 20 to move ever more tightly into contact with the tubing to be cut. As a result of this arrangement, which I regard as a spring override, the rotatable adjustment means 74 can be tightened to an extent sufficient to cause the cutter wheel 20 to cut tubing that is very hard, with one example being tubing of stainless steel.

Figure 8:
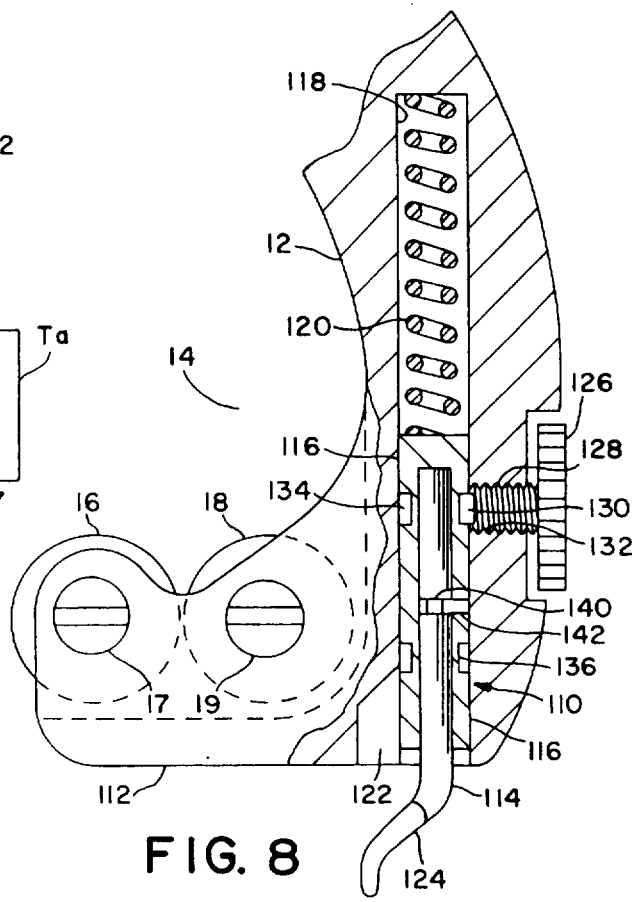
FIG. 8 is a side elevational fragmentary view to a large scale of a lower portion of the cutter body, revealing the deburring tool in an extended position suitable for use by the operator in removing the internal burr usually created when tubing is cut.

Turning now to a consideration of the aspect of my invention concerned with providing the user with an improved means for deburring the interior of each end of the cut tubing, it will be noted in FIG. 1 and in greater detail in FIG. 8 that I have provided a rotatable, selectively extensible deburring assembly 110 accessible through the lower surface 112 of the body member 12. The rotatable deburring assembly 110 involves a retractable deburring tool 114 disposed in a rotatable manner in a deburring housing 116 that is located in a vertically disposed cavity 118 provided in the lowermost portion of the body member 12. The cavity 118 is circular in cross section, with the deburring housing 116 being slidably located in this cavity. It is to be noted that the deburring housing 116 is biased downwardly by an elongate compression spring 120, which normally serves to force the deburring housing 116 into the extended or operative position.

In order to enable the user to lock the deburring tool assembly 110 in the retracted position shown in FIG. 1, as well as to enable the user, on occasion, to lock the deburring tool assembly in the extended position shown in FIG. 8, I provide a rotatable retention wheel or tightening wheel 126 having a threaded portion 128 operatively mounted in threaded hole 132 provided in a lower portion of the cutter body 12. The wheel 126 preferably has a knurled periphery so as to enable the user to cause the deburring tool assembly to be tightly engaged by the innermost end portion 130 of the threaded part 128 of the retention wheel.

I prefer to utilize an upper retention groove 134 and a lower retention groove 136 on the deburring housing 116, each of which grooves can be readily engaged by the innermost end portion 130 of the threaded portion 128 of the retention wheel 126 when its threaded portion 128 has been rotated in the inward or tightening direction into the threaded hole 132. These grooves prevent undesired slippage of the deburring housing 116 away from the retracted position shown in FIG. 1 as well as preventing the deburring tool assembly from moving back into the cutter body during a deburring operation.

It is to be noted that the deburring tool 114 is rotatably mounted in the deburring housing 116, so that the sharpened edges 124 of the retractable deburring tool 114 can follow the interior surface of the cut piece of tubing during a simple circular movement of the tubing cutter, rather than it being necessary for the entire tubing cutter to be rotated in order to effect a deburring operation.

To prevent the deburring tool 114 from dropping out of the deburring housing, I cut a groove 140 around a mid portion of the tool, which is engaged by a locking pin 142, thus assuring the tool remaining in the deburring housing at all times. Offset cavity 122 is provided in a lower portion of the body member 12 for receiving the offset sharpened end portion 124 of the retractable deburring blade at such time as the blade is to be stored.

Figure 10:
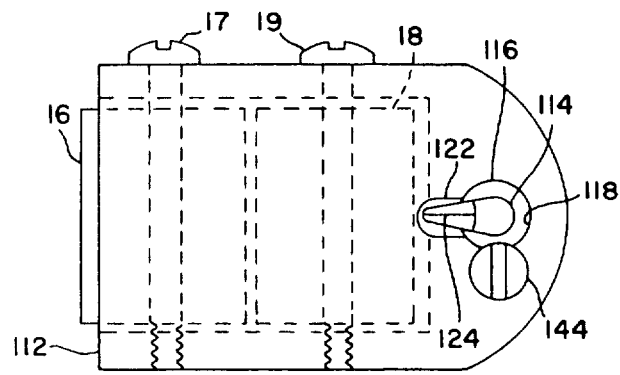
FIG. 10 is a view of the underside of the tubing cutter, showing the mounting of the pair of rollers, and the retention screw preventing the undesired extension of the deburring tool.
Figure 12:
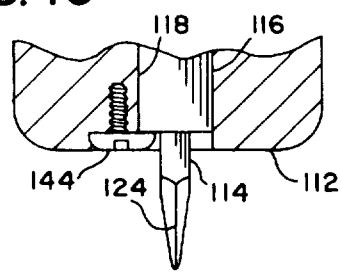
FIG. 12 is a fragmentary view to a large scale of the sharpened edges of the deburring tool, when in the extended position.

To prevent the entire deburring housing 116 from sliding out of the vertically disposed cavity 118 in the lower portion of the cutter body, I provide a locking screw 144, which is revealed in FIGS. 10 and 12.

It should now be apparent that I have provided a highly advantageous hand operated tubing cutter having means enabling the preadjustment of the cutting pressure to exact increments, thereby permitting the selection of a maximum safe force for the cutting of tubing of a particular material, and preventing an undesired deformation of relatively soft tubing during the cutting procedure. To this end I have provided quantitative measurement scales enabling the user to carefully select the optimum spring pressure to be used in cutting a particular piece of tubing, but with this feature able to be overridden when particularly hard tubing is to be cut. Another significant feature of my invention is the novel arrangement enabling the space or opening between the cutter wheel and the pair of support rollers to be preadjusted, thus minimizing the need for the rotatable adjustment device to be rotated to a substantial extent during one handed operation of my tubing cutter.

I claim:

1. A hand operated tubing cutter adapted to apply a selectable force to tubing to be cut, said cutter having a body member defining a recess in which a piece of tubing to be cut can be placed, tubing support means operatively mounted on said body member in said central recess, directly against which tubing support means a piece of tubing to be cut is to be placed, an elongate cavity disposed in said body member having an axis which intersects said tubing support means, an elongate ram member slidably disposed in a non-rotatable manner in said elongate cavity, with one end of said ram member supporting a rotatable cutter wheel in an opposed relationship to said tubing support means, rotatable adjustment means located on said body member at a location comparatively remote from said tubing support means, a compression spring disposed in said body member and operably interconnected with said ram member, said rotatable adjustment means being selectively rotatable to control the positioning of said ram member and therefore the positioning of said cutter wheel with respect to said tubing support means, a quantitative measurement scale located on said ram member, to assist the user in the positioning said cutter wheel, the selective rotation of said rotatable adjustment means also serving to modify the force applied to said ram member by said spring, and therefore the force applied to said cutter wheel, thereby selectively controlling the amount of force consistently applied by said cutter wheel to a piece of tubing residing against said tubing support means, said rotatable adjustment means having a lower peripheral portion, a quantitative measurement scale utilized on an upper portion of said body member at a location adjacent said lower peripheral portion, with said scale on said body member identifying units of pressure, and a quantitative measurement scale on said lower peripheral portion of said rotatable adjustment means, latter scale identifying subunits of pressure, said scales together enabling a user to precisely preadjust said spring to a desired cutting pressure by appropriate rotation of said rotatable adjustment means, thus to enable the user of the tubing cutter to readily establish the degree of force being applied in a given instance by said cutter wheel to the tubing.

2. A hand operated tubing cutter adapted to apply a selectable force to tubing to be cut, said cutter having an elongate, substantially "C" shaped body member, said body member defining a central recess in which a piece of tubing to be cut can be placed, a spaced pair of rollers operatively mounted on said body member in said central recess, directly against which rollers a piece of tubing to be cut is to be placed, an elongate cavity disposed in said body member having an axis which intersects said pair of rollers, an elongate ram member slidably disposed in a non-rotatable manner in said elongate cavity, with one end of said ram member supporting a rotatable cutter wheel, said cutter wheel being supported on said ram member in an opposed relationship to said rollers, rotatable adjustment means located on said body member at a location comparatively remote from said pair of rollers, a compression spring disposed in said body member and operably interconnected with said ram member, said rotatable adjustment means being selectively rotatable to control the positioning of said ram member and therefore the positioning of said cutter wheel with respect to said rollers, the selective rotation of said rotatable adjustment means also serving to modify the force applied to said ram member by said spring, and therefore the force applied to said cutter wheel, thereby selectively controlling the amount of force consistently applied by said cutter wheel to tubing residing against said rollers, and motion limiting means utilized for limiting the amount of spring compression able to be brought about by rotation of said rotatable adjustment means, with further force applied by said rotatable adjustment means to said ram member during contact of said cutter wheel with the tubing bringing about the direct application of force to said ram, and therefore to said cutter wheel.

3. The hand operated tubing cutter adapted to apply a selectable force to tubing to be cut as recited in claim 2 in which said rotatable adjustment means threadedly engages said ram member, with rotation of said rotatable adjustment means in a tightening direction serving to move said cutter wheel closer to said rollers, and rotation in the opposite direction causing said cutter wheel to move away from said rollers.

4. The hand operated tubing cutter adapted to apply a selectable force to tubing to be cut as recited in claim 3 in which said rotatable adjustment means has a lower peripheral portion upon which a quantitative measurement scale is utilized, said scale being utilized by a user in conjunction with certain markings on said body member when rotating said rotatable adjustment means to selectively adjust the force of said spring, and thus establish the degree of force to be applied by said cutter wheel to the tubing.

5. A hand operated tubing cutter adapted to apply a selectable force to tubing to be cut, said cutter having an elongate, substantially "C" shaped body member, said body member defining a central recess in which a piece of tubing to be cut can be placed, a spaced pair of rollers operatively mounted on said body member in said central recess, directly against which rollers a piece of tubing to be cut is to be placed, an elongate cavity disposed in said body member having an axis which intersects said pair of rollers, an elongate ram member slidably disposed in a non-rotatable manner in said elongate cavity, with one end of said ram member supporting a rotatable cutter wheel, said cutter wheel being supported on said ram member in an opposed relationship to said rollers, rotatable adjustment means located on said body member at a location comparatively remote from said pair of rollers, a compression spring disposed in said body member and operably interconnected with said ram member, said rotatable adjustment means being selectively rotatable to control the positioning of said ram member and therefore the positioning of said cutter wheel with respect to said rollers, the selective rotation of said rotatable adjustment means also serving to modify the force applied to said ram member by said spring, and therefore the force applied to said cutter wheel, thereby selectively controlling the amount of force consistently applied by said cutter wheel to tubing residing against said rollers, said rotatable adjustment means threadedly engaging said ram member, with rotation of said rotatable adjustment means in a tightening direction serving to move said cutter wheel closer to said rollers, and rotation in the opposite direction causing said cutter wheel to move away from said rollers, said rotatable adjustment means having a lower peripheral portion, a quantitative measurement scale utilized on an upper portion of said body member at a location adjacent said lower peripheral portion, with said scale on said body member identifying units of pressure, and a quantitative measurement scale on said lower peripheral portion of said rotatable adjustment means, latter scale identifying subunits of pressure, said scales together enabling a user to precisely preadjust said spring to a desired cutting pressure by appropriate rotation of said rotatable adjustment means, thus to enable the user of the tubing cutter to readily establish the degree of force being applied in a given instance by said cutter wheel to the tubing.

6. The hand operated tubing cutter adapted to apply a selectable force to tubing to be cut as recited in claim 5 in which said body member has an undersurface in which a cavity is located, and a deburring tool equipped with a sharpened edge rotatably mounted in said cavity, and means for securing said deburring tool in either a recessed position in said cavity, or else in an active, extended position in which the sharpened edge of said tool is available for use in deburring a cut piece of tubing.

7. The hand operated tubing cutter adapted to apply a selectable force to tubing to be cut as recited in claim 5 in which said ram is disposed alongside a reference mark, with a number scale being located on a visible portion of said ram, the relationship of said number scale to said reference mark enabling the user to establish the spacing of said cutter wheel from said rollers, and hence the size tubing that can be accommodated for a particular positioning of said ram.

8. A hand operated tubing cutter adapted to apply a selectable force to tubing to be cut, said cutter having an elongate, substantially "C" shaped body member, said body member defining a central recess in which a piece of tubing to be cut can be placed, a spaced pair of rollers operatively mounted on said body member in said central recess, directly against which rollers a piece of tubing to be cut is to be placed, an elongate cavity disposed in said body member having an axis which intersects said pair of rollers, an elongate ram member slidably disposed in a non-rotatable manner in said elongate cavity, with one end of said ram member supporting a rotatable cutter wheel, said cutter wheel being supported on said ram member in an opposed relationship to said rollers, rotatable adjustment means located on an upper portion of said body member, at a location comparatively remote from said pair of rollers, a compression spring disposed in said body member and operably interconnected with said ram member, interconnection means attached to said rotatable adjustment means and provided with threads at one end, which threads are threadedly interconnected with said ram member, said rotatable adjustment means being selectively rotatable to control the positioning of said ram member and therefore the placement of said cutter wheel with respect to said rollers, the selective rotation of said rotatable adjustment means also serving to modify the force applied to said ram member by said spring, and therefore the force applied to said cutter wheel, thereby selectively controlling the amount of force consistently applied by said cutter wheel to a piece of tubing residing against said rollers, motion limiting means being utilized for limiting the amount of spring compression able to be brought about by rotation of said rotatable adjustment means, with further force applied by said rotatable adjustment means to said ram member during contact of said cutter wheel with the tubing bringing about the direct application of force to said ram, and therefore to said cutter wheel.

9. The hand operated tubing cutter adapted to apply a selectable force to tubing to be cut as recited in claim 8 in which said ram is disposed alongside a reference mark, and a number scale located on a visible portion of said ram, the relationship of said number scale to said reference mark enabling the user to establish the spacing of said cutter wheel from said rollers, and hence the size tubing that can be accommodated for a particular adjustment of said rotatable adjustment means.

10. The hand operated tubing cutter adapted to apply a selectable force to tubing to be cut as recited in claim 9 in which said rotatable adjustment means has a lower peripheral portion upon which a quantitative measurement scale is utilized, said scale being utilized by a user in conjunction with certain markings on said body member when rotating said rotatable adjustment means to selectively adjust the force of said spring, and thus establish the degree of force to be applied by said cutter wheel to the tubing.

11. The hand operated tubing cutter adapted to apply a selectable force to tubing to be cut as recited in claim 9 in which said rotatable adjustment means has a lower peripheral portion, a quantitative measurement scale utilized on an upper portion of said body member at a location adjacent said lower peripheral portion, with said scale on said body member identifying units of pressure, and a quantitative measurement scale on said lower peripheral portion of said rotatable adjustment means, latter scale identifying subunits of pressure, said scales together enabling a user to precisely preadjust said spring to a desired cutting pressure by appropriate rotation of said rotatable adjustment means, thus to enable the user of the tubing cutter to readily establish the degree of force being applied in a given instance by said cutter wheel to the tubing.

12. The hand operated tubing cutter adapted to apply a selectable force to tubing to be cut as recited in claim 9 in which said body member has an undersurface in which a cavity is located, a deburring tool equipped with a sharpened edge rotatably mounted in said cavity, and means for securing said deburring tool in either a recessed position in said cavity, or else in an active, extended position in which said sharpened edge of said tool is available for use in deburring a cut piece of tubing.

* * * * *